United States Patent
Busby et al.

(10) Patent No.: US 10,837,555 B2
(45) Date of Patent: Nov. 17, 2020

(54) METAL MESH WITH A LOW ELECTRICAL RESISTANCE CONVERSION COATING FOR USE WITH AIRCRAFT STRUCTURES

(71) Applicant: AVIATION DEVICES & ELECTRONIC COMPONENTS, L.L.C., Fort Worth, TX (US)

(72) Inventors: Jeff Busby, Millsap, TX (US); Kent Boomer, Aledo, TX (US); Matt Boyd, Fort Worth, TX (US); Emily Samuelson, Fort Worth, TX (US)

(*) Notice: Subject to any disclaimer, the term of this patent is extended or adjusted under 35 U.S.C. 154(b) by 0 days.

(21) Appl. No.: 15/094,571

(22) Filed: Apr. 8, 2016

(65) Prior Publication Data

US 2016/0298765 A1    Oct. 13, 2016

Related U.S. Application Data

(60) Provisional application No. 62/144,381, filed on Apr. 8, 2015.

(51) Int. Cl.
| | |
|---|---|
| *F16J 15/02* | (2006.01) |
| *B64D 37/00* | (2006.01) |
| *B64D 47/00* | (2006.01) |
| *F16J 15/12* | (2006.01) |
| *B64C 7/00* | (2006.01) |

(52) U.S. Cl.
CPC ............. *F16J 15/022* (2013.01); *B64C 7/00* (2013.01); *B64D 37/005* (2013.01); *B64D 47/00* (2013.01); *F16J 15/122* (2013.01)

(58) Field of Classification Search
CPC .......... F16J 15/10; F16J 15/102; F16J 15/022; F16J 15/122

USPC ....... 277/653, 651, 652, 650, 312, 920, 654; 156/379.7
See application file for complete search history.

(56) References Cited

U.S. PATENT DOCUMENTS

| 214,083 A * | 4/1879 | Beardmore ............. B29C 70/22 |
| | | 152/367 |
| 1,851,948 A | 3/1932 | Summers |
| 2,092,393 A | 9/1937 | Hewitt |

(Continued)

FOREIGN PATENT DOCUMENTS

| DE | 3720224 A1 | 1/1989 |
| EP | 0114813 | 7/1982 |

(Continued)

OTHER PUBLICATIONS

European Space Agency, Assessment of Chemical Conversion Coatings for the Protection of Aluminium Alloys, A Comparison of Alodine 1200 with Chromium-Free Conversion Coatings, Pereira, et al., ESA STM-276, 59 pages Feb. 1, 2008.

(Continued)

*Primary Examiner* — Eugene G Byrd

(57) ABSTRACT

A gasket is provided with a tacky polyurethane or polyurea gel body and a metallic mesh skeleton where the skeleton has been coated with a conversion coating. The conversion coating helps reduce corrosion in the gasket and corrosion on the parts that place the gasket under compression, especially where an environment conducive to galvanic corrosion is present. This gasket may then be used in assemblies which include aircraft parts, which parts may be subject to extreme environmental conditions.

61 Claims, 18 Drawing Sheets

(56) References Cited

U.S. PATENT DOCUMENTS

| | | | |
|---|---|---|---|
| 2,477,267 A * | 7/1949 | Robinson | H01B 1/00 174/129 R |
| 2,481,760 A | 9/1949 | Leher | |
| 2,679,468 A | 5/1954 | Pitman | |
| 2,957,784 A * | 10/1960 | Schiefelbein | C09D 109/02 428/472 |
| 2,992,151 A * | 7/1961 | Niessen | F16J 15/122 277/592 |
| 3,030,260 A | 4/1962 | Metzler | |
| 3,107,195 A | 10/1963 | Stegler et al. | |
| 3,126,440 A * | 3/1964 | Goodloe | H05K 9/0015 174/358 |
| 3,195,906 A | 7/1965 | Moyers | |
| 3,230,290 A * | 1/1966 | Nelson | B29D 99/0053 156/228 |
| 3,446,906 A | 5/1969 | Zulauf | |
| 3,473,813 A | 10/1969 | Meyers | |
| 3,532,349 A | 10/1970 | Czernik | |
| 3,542,939 A * | 11/1970 | Mintz | B65H 81/00 174/358 |
| 3,555,168 A | 1/1971 | Frykberg | |
| 3,610,809 A | 10/1971 | Eigenbrod | |
| 3,616,841 A | 11/1971 | Walz | |
| 3,655,210 A | 4/1972 | Farnam et al. | |
| 3,679,059 A | 7/1972 | Wyatt et al. | |
| 3,681,272 A | 8/1972 | Gloskey | |
| 3,863,936 A | 2/1975 | Farnam | |
| 3,993,833 A | 11/1976 | Esmay | |
| 4,037,009 A * | 7/1977 | Severinsen | B32B 25/10 174/357 |
| 4,090,988 A | 5/1978 | Babiec | |
| 4,103,913 A | 8/1978 | McDowell | |
| 4,152,479 A | 5/1979 | Larsen | |
| 4,180,211 A * | 12/1979 | Olcott | F02K 9/97 239/265.43 |
| 4,183,699 A | 1/1980 | Donan | |
| 4,204,691 A | 5/1980 | Makino | |
| 4,305,696 A | 12/1981 | Pask | |
| 4,325,280 A | 4/1982 | Hardy | |
| 4,530,443 A | 7/1985 | Gorges | |
| 4,544,169 A | 10/1985 | Cobb | |
| 4,628,783 A | 12/1986 | Brownell et al. | |
| 4,635,949 A | 1/1987 | Lucas | |
| 4,678,863 A | 7/1987 | Reese et al. | |
| 4,762,641 A | 8/1988 | Denton et al. | |
| 4,768,254 A | 9/1988 | Bell | |
| 4,835,060 A | 5/1989 | Kosiarski | |
| 4,865,905 A * | 9/1989 | Uken | H01B 17/60 156/48 |
| 4,900,629 A * | 2/1990 | Pitolaj | B29C 67/04 277/608 |
| 4,900,877 A * | 2/1990 | Dubrow | H05K 9/0015 174/351 |
| RE333,392 | 10/1990 | Brauer | |
| 5,037,879 A | 8/1991 | Roberts | |
| 5,054,793 A | 10/1991 | Hauenstein | |
| 5,128,209 A | 7/1992 | Sakai et al. | |
| 5,158,638 A | 10/1992 | Osanami | |
| 5,240,766 A | 8/1993 | Foster | |
| 5,270,364 A | 12/1993 | Schwartz et al. | |
| 5,294,270 A | 3/1994 | Fenical | |
| 5,437,767 A | 8/1995 | Halout et al. | |
| 5,512,709 A | 4/1996 | Jencks et al. | |
| 5,512,790 A | 4/1996 | Jencks et al. | |
| 5,534,295 A | 7/1996 | Schlichter et al. | |
| 5,536,565 A | 7/1996 | Halout et al. | |
| 5,702,111 A * | 12/1997 | Smith | F16J 15/123 277/650 |
| 5,791,654 A * | 8/1998 | Gaines | H05K 9/0015 174/357 |
| 5,890,719 A | 4/1999 | Bettencourt | |
| 5,910,524 A | 6/1999 | Kalinoski | |
| 5,929,138 A * | 7/1999 | Mercer | C08K 3/22 523/220 |
| 5,957,606 A | 9/1999 | Jafarmadar | |
| 5,984,317 A * | 11/1999 | Grant-Acquah | F16J 15/122 277/592 |
| 6,056,526 A | 5/2000 | Sato | |
| 6,121,545 A | 9/2000 | Peng | |
| 6,309,742 B1 | 10/2001 | Clupper et al. | |
| 6,312,022 B1 | 11/2001 | Brophy, III et al. | |
| 6,346,330 B1 | 2/2002 | Huang et al. | |
| 6,357,764 B1 | 3/2002 | Gaines et al. | |
| 6,364,976 B2 | 4/2002 | Fletemier | |
| 6,365,812 B1 | 4/2002 | McGill | |
| 6,403,226 B1 | 6/2002 | Biernath et al. | |
| 6,410,137 B1 * | 6/2002 | Bunyan | C08K 5/06 428/355 R |
| 6,454,267 B1 * | 9/2002 | Gaines | H01Q 1/42 174/358 |
| 6,457,726 B1 * | 10/2002 | Jung | F16J 15/127 277/593 |
| 6,460,859 B1 | 10/2002 | Hammi et al. | |
| 6,465,731 B1 | 10/2002 | Miska | |
| 6,521,029 B1 | 2/2003 | Matzdorf | |
| 6,530,577 B1 * | 3/2003 | Busby | B32B 27/04 277/651 |
| 6,553,664 B1 | 4/2003 | Schenk | |
| 6,598,883 B1 | 7/2003 | Hammi et al. | |
| 6,695,320 B2 | 2/2004 | Busby | |
| 6,717,047 B2 * | 4/2004 | Haselby | H01R 13/65802 174/152 G |
| 6,719,293 B1 * | 4/2004 | Coles | H01Q 1/42 277/312 |
| 6,761,360 B2 | 7/2004 | Hammi | |
| 6,857,638 B2 | 2/2005 | Dupont et al. | |
| 7,229,516 B2 * | 6/2007 | Busby | B32B 27/04 156/247 |
| 7,290,769 B2 | 11/2007 | Piona | |
| 7,314,671 B1 | 1/2008 | Preikschat et al. | |
| 7,314,898 B2 | 1/2008 | Downing, Jr. et al. | |
| 7,455,301 B2 * | 11/2008 | Ragsdale | F16J 15/122 277/627 |
| 7,520,097 B2 | 4/2009 | Aalbers et al. | |
| 7,654,538 B2 | 2/2010 | Oka | |
| 7,850,387 B2 | 12/2010 | Chapin | |
| 7,915,371 B2 | 3/2011 | Byrd et al. | |
| 8,138,273 B2 | 3/2012 | Rao et al. | |
| 8,240,040 B2 | 8/2012 | Miyamoto et al. | |
| 8,387,994 B2 | 3/2013 | Stehmeier et al. | |
| 8,545,974 B2 | 10/2013 | Creasy | |
| 8,691,033 B1 * | 4/2014 | Busby | C09J 5/00 156/247 |
| 8,707,534 B2 | 4/2014 | Apfel | |
| 8,759,692 B2 | 6/2014 | Bunyan et al. | |
| 8,766,108 B2 | 7/2014 | Bunyan et al. | |
| 8,968,853 B2 * | 3/2015 | Zhou | C09J 7/045 428/343 |
| 8,968,861 B2 * | 3/2015 | Creasy, Jr. | C09J 7/048 427/208.4 |
| 9,016,697 B2 | 4/2015 | Boyd et al. | |
| 9,061,478 B2 * | 6/2015 | Choi | B32B 5/022 |
| 9,238,760 B2 * | 1/2016 | Harkins | C09D 5/24 |
| 2001/0001684 A1 | 5/2001 | Sylvester | |
| 2001/0038180 A1 | 11/2001 | Gaines et al. | |
| 2002/0063397 A1 | 5/2002 | Gaines et al. | |
| 2002/0135137 A1 | 9/2002 | Hammi | |
| 2003/0175512 A1 | 9/2003 | Ishiguro et al. | |
| 2004/0041356 A1 * | 3/2004 | Smith | B32B 27/04 277/651 |
| 2004/0070156 A1 * | 4/2004 | Smith | B32B 27/04 277/651 |
| 2005/0023768 A1 | 2/2005 | Adams | |
| 2006/0135674 A1 | 6/2006 | Ishiguro et al. | |
| 2006/0135675 A1 | 6/2006 | Ishiguro et al. | |
| 2007/0167583 A1 * | 7/2007 | Yano | C08J 3/24 525/474 |
| 2008/0179913 A1 | 7/2008 | Coon et al. | |
| 2008/0193728 A1 | 8/2008 | Yoshida et al. | |
| 2009/0020917 A1 | 1/2009 | Henning | |
| 2009/0322040 A1 * | 12/2009 | Banba | B32B 7/12 277/654 |

(56) References Cited

U.S. PATENT DOCUMENTS

| | | |
|---|---|---|
| 2010/0253012 A1 | 10/2010 | Zhuang et al. |
| 2010/0258200 A1 | 10/2010 | Walker |
| 2010/0289242 A1 | 11/2010 | Nitsche et al. |
| 2001/0067918 | 3/2011 | Whu et al. |
| 2011/0156353 A1 | 6/2011 | Kabutoya et al. |
| 2011/0308701 A1 | 12/2011 | Lavery et al. |
| 2012/0048612 A1 | 3/2012 | Bunyan et al. |
| 2013/0001894 A1 | 1/2013 | Busby et al. |
| 2013/0052461 A1 | 2/2013 | Muta et al. |
| 2013/0062468 A1* | 3/2013 | Yokoi .................. B64C 1/1492 244/129.3 |
| 2013/0091864 A1 | 4/2013 | Auzelyte et al. |
| 2013/0092410 A1 | 4/2013 | Bunyan et al. |
| 2013/0244013 A1 | 9/2013 | Nakayama et al. |
| 2013/0260120 A1 | 10/2013 | Hirayama et al. |
| 2013/0273342 A1 | 10/2013 | Johnson et al. |
| 2014/0015204 A1* | 1/2014 | Boyd .................. F16J 15/021 277/640 |
| 2014/0062036 A1 | 3/2014 | Maeda et al. |
| 2014/0120365 A1 | 5/2014 | Miyoshi |
| 2014/0167367 A1 | 6/2014 | Busby et al. |
| 2014/0213716 A1 | 7/2014 | Okada et al. |
| 2014/0287222 A1 | 9/2014 | Hirai et al. |
| 2014/0312574 A1* | 10/2014 | Busby .................. F16J 15/061 277/637 |
| 2014/0319276 A1* | 10/2014 | Yokoi ..................... B60J 10/16 244/129.3 |
| 2014/0326830 A1 | 11/2014 | Busby et al. |
| 2014/0334868 A1 | 11/2014 | Apfel |
| 2015/0069722 A1 | 3/2015 | Boyd et al. |
| 2016/0017143 A1 | 1/2016 | Falteisek |
| 2016/0268790 A1* | 9/2016 | Panfil ...................... H01Q 1/48 |

FOREIGN PATENT DOCUMENTS

| | | |
|---|---|---|
| EP | 0324255 A2 | 7/1989 |
| EP | 0730017 | 9/1996 |
| EP | 1342763 | 9/2003 |
| EP | 1850651 | 10/2007 |
| EP | 2341113 A2 | 7/2011 |
| EP | 2412774 | 1/2012 |
| EP | 2166219 B1 | 6/2012 |
| EP | 2565245 | 3/2013 |
| EP | 2644669 | 10/2013 |
| JP | 09109346 A | 4/1997 |
| WO | 2005030893 | 9/2004 |

OTHER PUBLICATIONS

International Search Report, PCT/US16/26760, 13 pages dated Jul. 11, 2016.
Henkel Surface Technologies, Technical Process Bulletin No. 235110, Alodine 1201, 4 pages Aug. 3, 1990.
Sky Geek, Henkel Alodine 1201, www.skygeek.com/henkel-alodine-1201-gallon.html, 2 pages Feb. 16, 2015.
MIL-DTL-5541F, AMSC N/A, Detail Specification, Chemical Conversion Coatings on Aluminum and Aluminum Alloys, 2 pages Nov. 30, 1990.
Material Safety Data Sheet ID 235110, Alodine 1201, 7 pages Jan. 18, 2005.
SurTec, Protection upgraded, SurTec 650, chromitAL TCP, 6 pages Jun. 15, 2015.
International Preliminary Report on Patentability, International Application No. PCT/US2016/026760, 12 pages. Oct. 19, 2017.
European Search Report, App. No. 16777414.0-1010/3280933 PCT/US2016026760, 7 pages Oct. 8, 2018.

\* cited by examiner

GENERAL PASSIVATION PROCESS

METAL MESH WITH A LOW ELECTRICAL RESISTANCE CONVERSION COATING FOR USE WITH AIRCRAFT STRUCTURES

This application claims priority from and the benefit of U.S. Patent Application Ser. No. 62/144,381, filed Apr. 8, 2015, and incorporates the same by reference herein.

FIELD OF THE INVENTION

Aircraft structures including gaskets, more particularly, structures having a metallic skeleton or other metallic substrate which, in some embodiment, is coated with a conductive or semi-conductive chromate coating.

BACKGROUND OF THE INVENTION

Gaskets are typically provided for maintaining an environmental seal between two pieces under compression. Gel type gaskets, including gel type gaskets with metallic woven skeletons are known, including those found in applicants patents U.S. Pat. Nos. 6,695,320, 6,530,577 and 7,229,516 incorporated herein by reference.

This invention relates to the surface treatment of metals to form a thin protective electrically conductive surface on an aluminum mesh, which mesh may be encapsulated in a cured polyurethane gel for use as a gasket between two aircraft parts, such as an aircraft antenna and an aircraft fuselage, where EMI protection is desired.

This invention includes a process for passivated aluminum or aluminum alloy where the aluminum or aluminum alloy may be used in an electrochemically active environment without material corrosion.

SUMMARY OF THE INVENTION

Applicant provides a gel bodied gasket with a gel encapsulated coated metallic skeleton member such as aluminum or aluminum alloy. The metallic skeleton has been subject to a chemical conversion coating which coating is bonded to the metallic skeleton, which chemical conversion coating is conductive or semi-conductive. The chemical conversion coating will provide corrosion resistance to the metallic skeleton, especially in an environment subject to electrical current or electric fields between metallic pieces under compression. One such environment, for example, is an antenna gasket in which the transmitting/receiving antenna may generate a potential difference between the antenna and the fuselage to which it is mounted. In such an environment, it is sometimes helpful to have a gel gasket to provide good environmental sealing along with a gel embedded metallic mesh skeleton to provide conductivity by way of contact between the two pieces under compression and the metallic skeleton. However, when metal mesh skeleton is used, such as an aluminum mesh, it may be subject to corrosion due to environmental chemicals or other factors which corrosion may be enhanced by an electrical field about the antenna or a potential difference between the opposed metal parts.

Applicant discloses a gasket for use between aircraft parts under compression, the gasket body is provided having a tacky elastomeric gel. A metal skeleton is encapsulated by the body of the gasket. The metal skeleton is encapsulated by the body of the gasket. The metal skeleton includes a thin conversion coating. The body may be a polyurethane gel. The metal skeleton may be an aluminum or aluminum alloy mesh. The resistance of the coated aluminum or aluminum alloy mesh is typically less than about 2.5 milliohms. The conversion layer, in one embodiment, is formed from a reaction of either a hexavalent chromium or a trivalent chromium. The conversion coating may include a non-hexavalent chromium coated to between about 100-250 mg/dm$^2$. The elastomeric gel may be a polyurethane and the gel may include a non-hexavalent chromium. The gel may include conductive particles or fibers. A second mesh skeleton may be provided, which may be metallic.

A method of producing a noncorrosive assembly is disclosed comprising: contacting an aluminum alloy exterior surface of an aluminum wire mesh or expanded metal aluminum with a composition comprising a trivalent chromium salt and an alkali metal hexafluorozirconate to form at surface coating on the aluminum or aluminum alloy surface and encapsulating the aluminum wire mesh into a tacky gel bodied gasket for use with aircraft parts. The parts may be subject to an electrical potential therebetween and the conversion coating may be electrically conductive, but inhibit galvanic corrosion on the mesh.

The objects of the disclosures set forth herein include providing for a chromium-based conversion coating on a metallic skeleton (such as an aluminum alloy mesh) which coating is thin enough to provide for electrical conductivity, but thick enough to provide for corrosion resistance in an electrochemically active environment such as where RF interference may be a problem between an aircraft antenna and an aircraft fuselage.

BRIEF DESCRIPTION OF THE DRAWINGS

FIG. 17 illustrates front and back side of the test assembly assembled together.

FIGS. 18 and 19 illustrate front and back SurTec wire post-cut assembly after 500 hours of exposure.

FIGS. 20 and 21 show aircraft side and antenna base side after 500 hours of salt fog exposure.

FIG. 26, front and back of typical test assembly prior to exposure.

FIGS. 27 and 28 disassembled front and back sides of test assembly after 500 hours of exposure.

FIGS. 29 and 30, close-ups of aircraft side and antenna base side after 500 hours of exposure.

FIG. 31, typical test assembly, front and back, prior to exposure.

FIGS. 32 and 33, front and back disassembled, after 500 hours of exposure.

FIGS. 34 and 35, front and back (aircraft side and antenna base side) after 500 hours of salt fog exposure.

DETAILED DESCRIPTION OF THE ILLUSTRATED EMBODIMENTS

Figure 1:
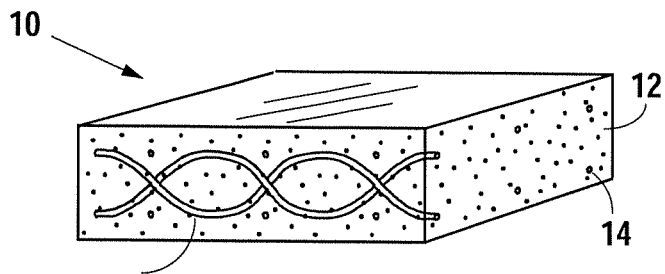
FIG. 1 is a cutaway perspective view of a composite that uses Applicant's conversion coated metallic mesh fabric.
Figure 2:
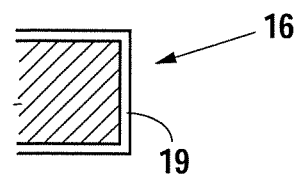
FIG. 2 is a cross-sectional view of a strand of conversion coated metal skeleton having a coated end.
Figure 3:
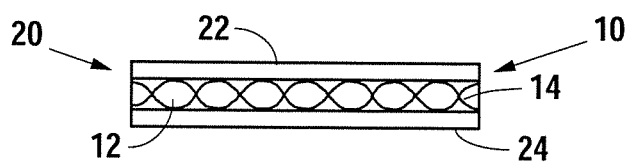
FIG. 3 is a cross-sectional view of an assembly comprising aircraft parts under compression with Applicant's composite therebetween.

FIGS. 1, 2, 3, 5, and 6 illustrate embodiments of applicants composite 10, and assemblies including Applicant's composite which, in some embodiments, comprise a gasket. In one embodiment, the composite may comprise a gasket having a Body 12 (in some embodiments, a tacky gel body) with a metallic skeleton 14, which metallic skeleton contains a thin conversion coating 19 as set forth herein. The skeleton may be a metal mesh skeleton comprising multiple strands 16 of aluminum or aluminum alloy cylindrical wire that are woven together to form the mesh usually an open weave mesh, similar to the mesh of a screen door. The skeleton may also be a metal, such as expanded aluminum. FIG. 2 illustrates that the individual strands (or the metal of a non-strand skeleton) may be coated in some embodiments even across a strand end as when a "cut-to-fit" gasket mesh is dipped in a bath of a conversion coating solution. FIG. 3 illustrates a use of applicants composite, in this embodiment a gasket having a gel body, between a movable part 22 and a base 24 with the movable part under compression against the base, as by fasteners, for example. Note in the embodiment illustrated, the opposed mating surfaces are flat or slightly curved and match one another and may be metallic, in one case at least one of the parts is aluminum or aluminum alloy. The skeleton and body are typically flexible enough to allow the gasket to fit a slight curvature and the gel is deformable and flowable under compression.

Body 12, typically a tacky polyurethane gel, substantially encapsulates the metal conversion coated skeleton 14 the gel body, in some embodiments, extending above and below the mesh in a first range of about 0 to 50 mil. as seen in FIG. 1 or a second, preferred range of about 10 to 30 mil. Body 12 may also be made of a sealant such as a fast setting, clear, two component polyurea available as Part Number SF2470 from KBS Chemical, Dodd City, Tex. The KBS material is a two-component urethane material designed for use as a watertight, flexible sealant. The low viscosity allows the material to be sprayed. The transparent nature of the sealant allows for inspection through the material, such as the skeleton, without removal. The system demonstrates excellent adhesion to itself (cohesion) and allows for easy removal from the aircraft parts when necessary.

In one embodiment, body 12 may comprise a two-part, cured, tacky, elastomeric polyurethane gel as set forth in the patents incorporated herein by reference, in one case the gel body having a hardness of between about 40 and 150 durometer. When composite 10 is under compression between movable part 22 and base 24, as when fasteners may be torqued down, the gel, being soft, deforms and, typically, some will squeeze out. This allows the movable part to come in contact with the upper surface of the metal mesh, forcing the metal mesh against the lower surface of the base, thereby providing an electrically conductive path between movable part 22 and base 24

Applicant discloses two similar processes and three resulting products, both processes and products resulting in a chemical conversion coating to a metallic skeleton or mesh, which coating is a thin electrically conductive coating but provides for some corrosion resistance.

Figure 5:
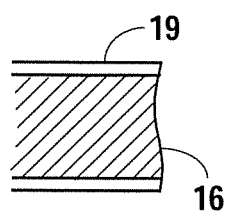
FIG. 5 is a cross-sectional view of a strand having an uncoated end.

FIG. 5 illustrates an uncoated strand end. Uncoated strand ends may occur when a coated wire mesh skeleton 14 is die cut as set forth herein and in the patents incorporated herein by reference. FIG. 3 illustrates a conversion coating 19 on the exposed surfaces of the wire forming the mesh skeleton 14.

The thickness and therefore the electrical resistance of the conversion coating may be controlled by the time in which the skeleton is immersed in the conversion coating solution (SurTec 650 or Alodine, for example) with a longer period of time creating the thicker coating.

Figure 6:
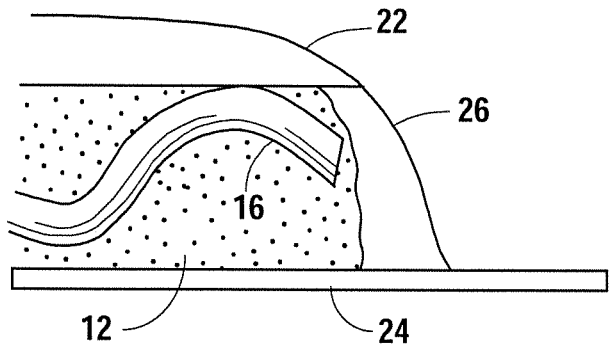
FIG. 6 is a cross-section of an embodiment of Applicant's composite as part of an assembly comprising aircraft parts under compression.

FIG. 6 illustrates the use of a perimeter sealant between movable part 22 and base 24, wherein composite 10 in one embodiment is slightly undercut leaving a gap, which gap is filled with a perimeter seal 26 such as AvDec Thixoflex® Orange, a two part elastomeric cure in place sealant (hardness about 55 to 75 shore "oo") or AvDec Thixoblack®, a firmer (about 70 to 90 durometer shore "A") perimeter sealant.

Figure 4:
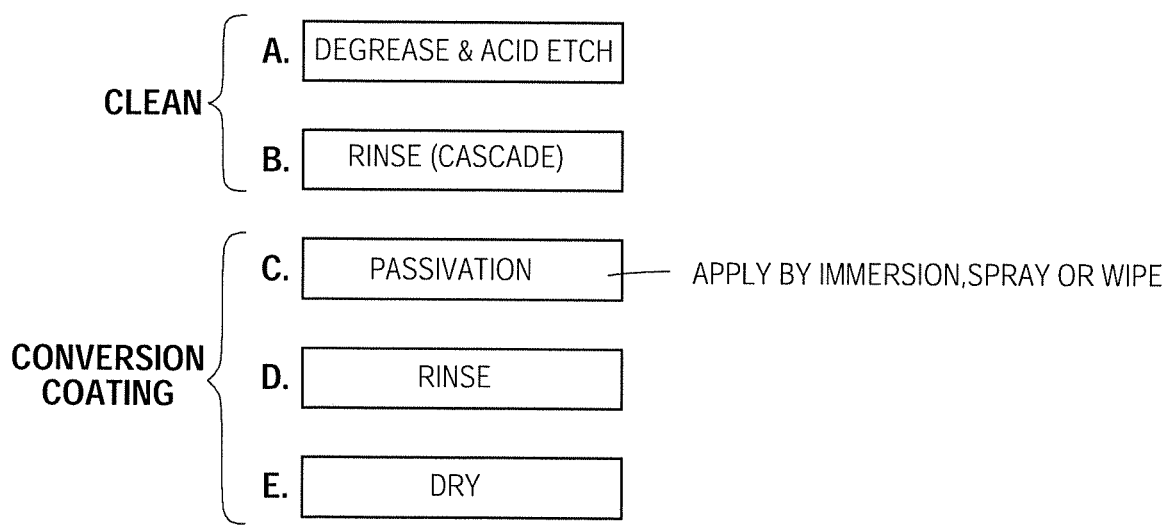
FIG. 4 is a flow chart showing steps taken for passivating a metal with a conversion coating of a chromium compound.

FIG. 4 illustrates that both conversion coating processes involve the steps of degreasing, chemically etching, then rinsing (together referred to as cleaning) and then chemically converting a surface of a metallic skeleton with a reactive composition that may contain chromium such that the coating contains, in some embodiments, either a trivalent or hexavalent chromium. The chemical conversion provides a chemical conversion coating, in one embodiment, by dipping an etched mesh skeleton in a conversion chemical. The coated metallic mesh is then embedded in a tacky gel (in one case polyurethane) and used as a gasket in a number of settings, some (such as an aircraft antenna) of which involve the use of aircraft parts under compression and subject to EMI (electromagnetic interference).

In one embodiment, the aluminum alloy of the mesh to be coated may be 2, 3, 5 or 6000 series alloy and in one embodiment is 5053 aluminum. Prior to coating, the base metal is mechanically or chemically cleaned such that a water break—free surface is obtained after rinsing. Abrasives containing iron, such as steel wool and the like should not be used for cleaning. The chemical conversion coating may be applied non-electrolytically by spray, brush, or immersion on the formed aluminum wire, open weave mesh.

The chemical conversion coating should be continuous in appearance and visibly discernible in daylight. It should be free from areas of powdery and loose coating, scratches, flaws and other defects for damages which reduce the corrosion protective value of the coating. A cleaner designed to chemically etched aluminum or aluminum alloy may be used. In one case, an acid etch may be used on 5053 aluminum alloy.

In one embodiment, the reactive composition providing the chemical conversion coating is an aqueous acidic solution which contains trivalent or hexavalent chromium. In a second embodiment, the reactive composition providing the chemical coating is Alodine® 1201 (a registered trademark of Henkel Surface Technologies) or SurTec 650 ChromitAL® (a registered trademark of SurTec International). The former provides for conversion coating comprising a hexavalent chromate and the latter a conversion coating comprising a trivalent chromate. Both materials form protective coatings by a chemical reaction with aluminum or aluminum alloys on the surface of the skeleton. Any suitable aqueous acidic solution containing trivalent or hexavalent chromate or suitable equivalents may be used. A hexafluorozirconate from an aqueous solution of dispotassium hexafluorozirconate, for example, may be used in conjunction with the chromate, or as an additional protective layer.

The weight of the passivation or conversion coated layer 19 depends, in part, on the roughness of the aluminum surface. Passivation layers with good corrosion resistance may, in some embodiments, have a weight of approximately 0.11-0.5 grams per square meter. Immediately upon drying of the treated surface, treated surfaces may be assembled with a two part polyurethane cure in place gel to form a gasket. Drying time may be room temperature up to about 100° C. and, in one embodiment, about 65° C., however, room temperature is preferred.

Spraying, brushing or wiping may also be used to apply the reactive chemical composition. A solution of 20% by volume of SurTec 650, 80% by volume of dionized water may be used. In some embodiments, the optimum coating weight may be between about 100 to 250 mg/dm2 for conductive conversion coatings.

Mil spec MIL-DTL-5541 F describes procedures for coating aluminum to produce a chemical conversion coating. While this mil spec describes the conversion coating of aluminum alloy flat sheet or plate, some of the information and disclosure may be utilized as set forth herein for the chemical conversion of an aluminum mesh or expanded metal or fabric comprised of multiple woven electrically conductive strands.

The conversion coatings may be applied to aluminum or aluminum alloy woven mesh substrates that are not anodized. The coating will inhibit galvanic corrosion. Coating thickness is varied by immersion time and as a result, the electrical conductivity can be controlled, —a thinner conversion coating yielding a metal with lower electrical resistance.

When under a nominal electrode pressure of about 200 psi, thin coatings may be tested under MIL-DTL-81706 to have a resistance not greater than 5,000 microhms (5 milliohms) per square inch and 10,000 microhms (10 milliohms) per square inch, after 168 hours of salt spray exposure. A preferable resistance is 2.5 milliohms or less. Other variables may affect resistance values other than coating thickness. These include surface roughness of the specimen, with rough surfaces yielding lower resistance values due to coating fracture. Moreover, if the surface area is not flat, such as in a woven aluminum alloy mesh, the actual contact points will be lower points, and a smaller contact area may result in a higher resistance value.

MIL-C-5541 Class 3 conversion coatings are required to have less than 200 milliohms of resistance when measured at 200 psi contact pressure after 168 hours of exposure to a 5% salt spray. In some embodiments, including those set forth below, the conversion coatings meet these parameters.

SurTec 650—Determination of the Layer Weight
Equipment: Analytical balance (+/−0.1 mg)
Reagents: 50% vol. nitiric acid (65%)
Procedure:
1. Passivate a test part with a known surface area in m$^2$ (preferably)>2 dm$^2$) in SurTec 650.
2. Rinse with deionized water and dry with compressed air at room temperature.
3. Weigh the dry part within 3 h after passivation with the analytical balance (=M$_1$).
4. Remove the passivation layer in nitric acid (4 min at 20-25° C.).
5. Rinse with deionized water and dry with compressed air at room temperature.
6. Weigh the dry part again with the analytical balance (=M$^2$).
7. Repeat the analysis with a cleaned and deoxidized but not—passivated test part (=M$_3$ and M$_4$)
Calculation:

$$(M^1-M^2)/\text{surface area}=A$$

$$(M^3-M^4)/\text{surface area}=B$$

$$A-B=\text{layer weight in g/m}^2$$

Hint: For determination of the layer weight always a fresh solution should be used.

At the latest after 1 m$^2$/l the solution has to be renewed.

Figure 7:
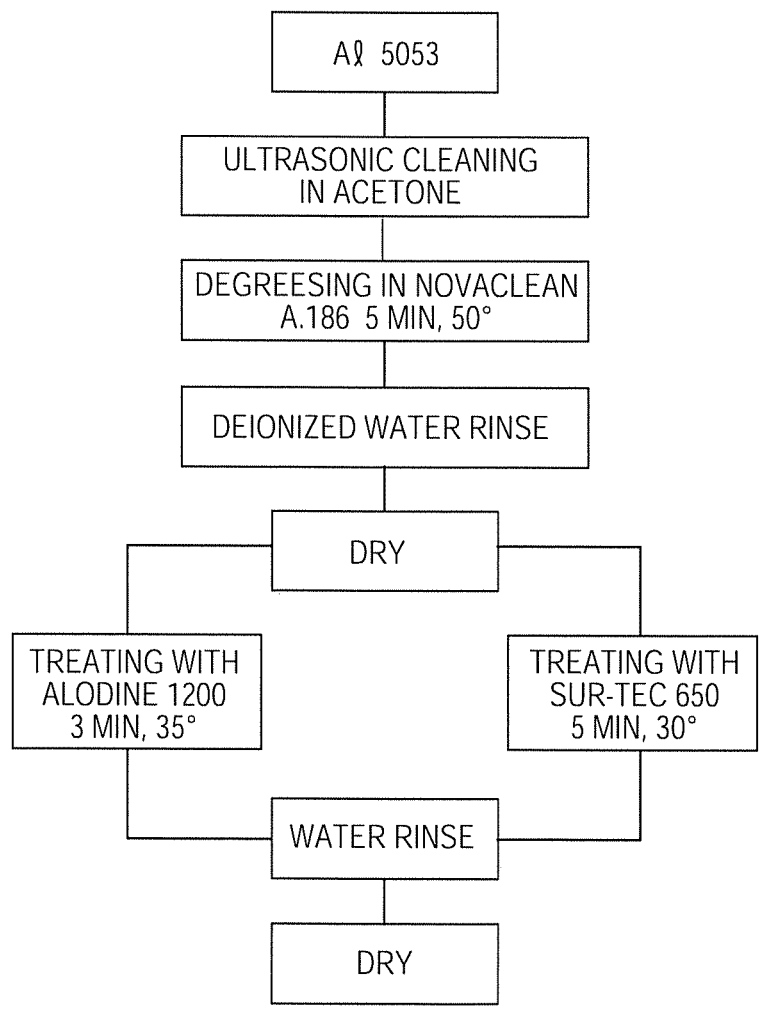
FIG. 7 is a more detailed flow chart showing steps taken for passivating a metal with examples of a conversion coating of a chromium compound.
Figure 8:
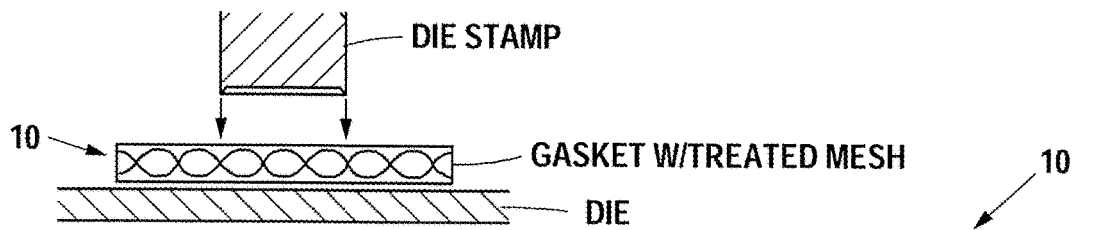
FIGS. 8 (cut finished gasket) and 8A (sealed uncoated strand ends) illustrate a coat, pour and cut method of preparing a gasket according to these specifications that leave uncoated strand ends.
Figure 8A:
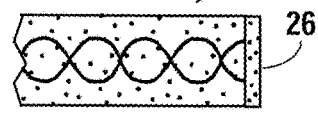
Figure 9:
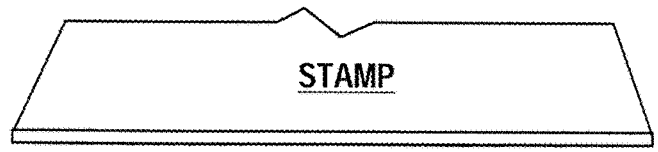
FIGS. 9 (cut), 9A (coat), and 9B (pour) illustrate a cut, coat and pour method of preparing a gasket according to these specifications.
Figure 9:
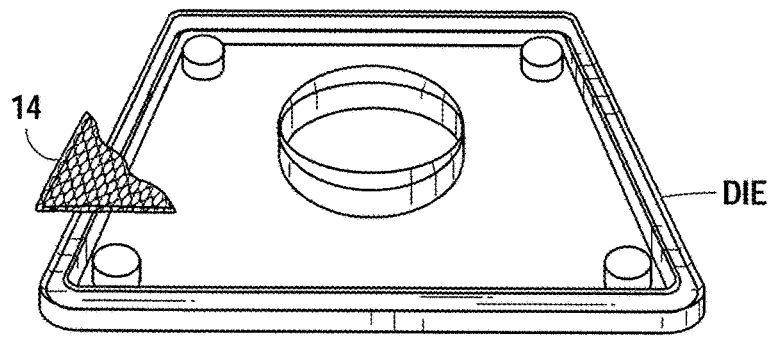
Figure 9A:
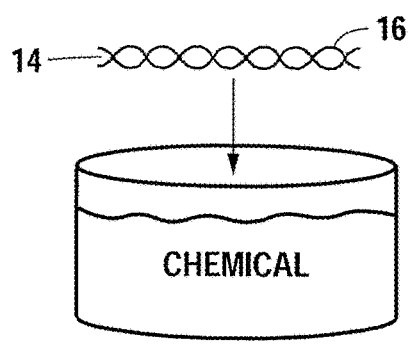
Figure 9B:
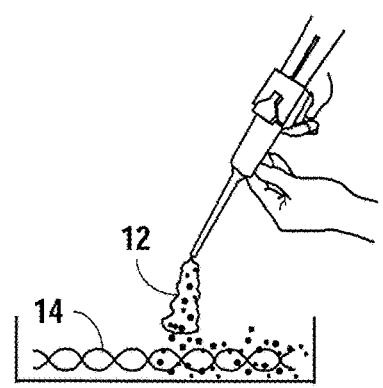
Figure 10:
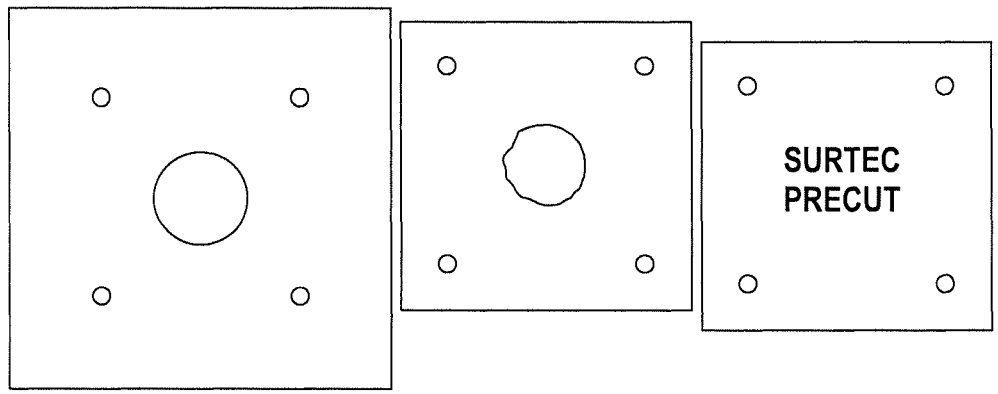
FIGS. 10 and 11 illustrate a typical salt fog test assembly (in pieces), front side and opposite or back side, prior to exposure.
Figure 11:
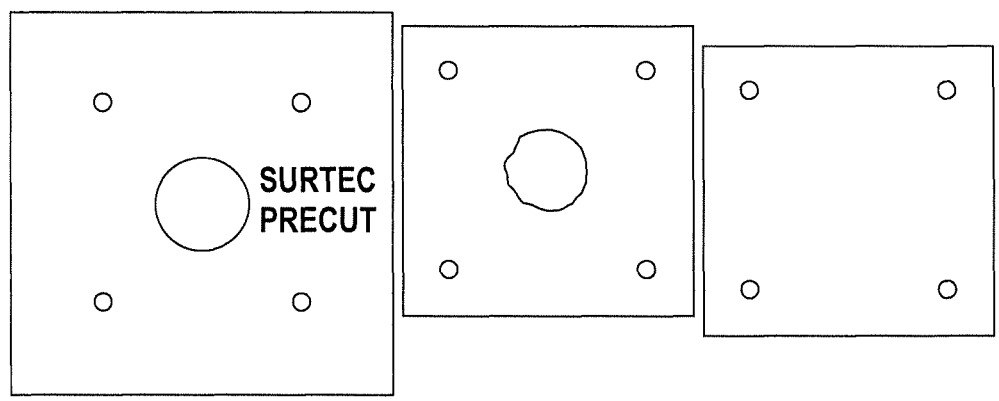

Two examples of conversion coatings are set forth below. These may be prepared by guidelines of the manufacturers, or those set forth in FIG. 7.

Example A (Alodine Coated Mesh, FIGS. 26-35)

Henkel Alodine 1201 Conversion Coating Treatment—
Alodine 1201 is a conversion coating (sometimes called "passivation") for aluminum or aluminum alloy, the reactive coating composition containing hexavalent (VI) chromium. It is nonflammable, chromic and acid-based and will produce a conversion coating on aluminum and its alloys. The coating formed by Alodine 1201 is gold to tan in color, and it becomes part of the aluminum surface. It offers good paint adhesion and corrosion resistance, but preserves electrical conductivity of the surface. While referred to as a coating, it is (like SurTec 650) actually a chemical treatment to the outer surface of the metal and will not materially change the dimensions of the workpiece. In some embodiments, it may be applied by brush or immersion.

Alumiprep 33 is one product recommended for pre-immersion cleaning. Alumiprep 33 is a nonflammable phosphoric acid-based cleaner that produces a chemically cleaned and corrosion free aluminum surface. After cleaning the metal should be thoroughly rinsed with water. To apply Alodine 1201, the product may be used undiluted or diluted by mixing about 33 parts of Alodine with about 67 parts of water for each 100 parts of bath volume required. Room temperature to about 100° F. is the usual temperature of operation and the time of immersion may be about 2 to 5 minutes, depending upon how much coating is required. Colors of the coating produced will vary from light gold to a dark tan. After treatment, the workpiece should be thoroughly rinsed with water. As an aid to drying, the treated part may be heated or blown off with clean, dry, filtered, forced air, or it may be gently wiped with a dry, clean rag.

Applicant manufactures products that are currently in use solving a wide variety of corrosion problems with non-hazardous polyurethane based products on commercial and military aircraft. This presents the results of salt fog exposure testing performed on various embodiments of Applicant's materials with coated mesh. Applicant's materials with coated mesh were tested by salt fog exposure in accordance with ASTM B117 to simulate accelerated real world application scenarios and to evaluate the effectiveness for corrosion prevention.

Materials Under Test:

Woven Mesh—Al 5056 18 strand/in each direction, 0.017 inch strand diameter, gel thickness 0.035 in.

Test A1 Coated Mesh—Cut before alodine treatment (strand ends coated) (FIGS. 32-35)

Test A2 Coated Mesh—Cut after alodine treatment (strand ends uncoated) (FIGS. 27-30)

Test A3 Regular Mesh—Conductive antenna gasket (uncoated control) (FIGS. 22-25)

For Alodine Treatment:

Mix 33 parts Alodine to 67 parts deionized water;

Soak mesh sample in Alodine for 2-5 minutes room temperature;

Dunk and rinse sample in deionized water; and

Allow to air dry (room temperature and humidity) for 24 hours.

In-Application Assembly

Figure 12:
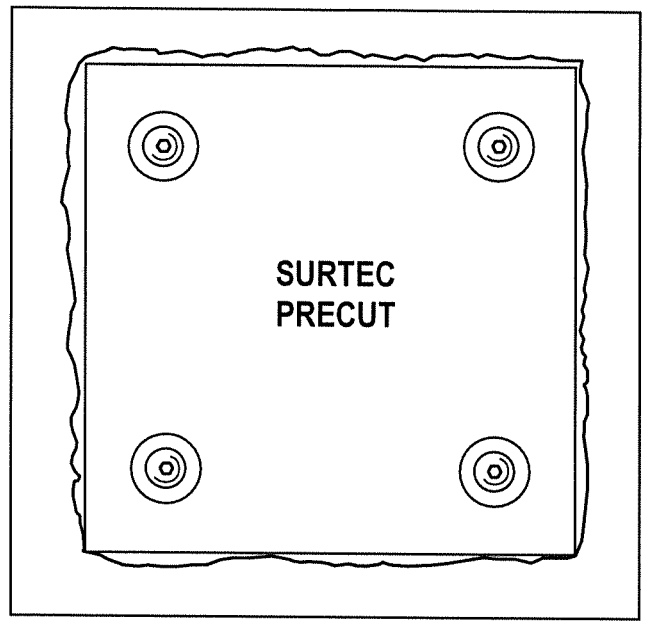
FIG. 12 illustrates the test assembly, front and back side, prior to exposure in the salt fog chamber.
Figure 12:
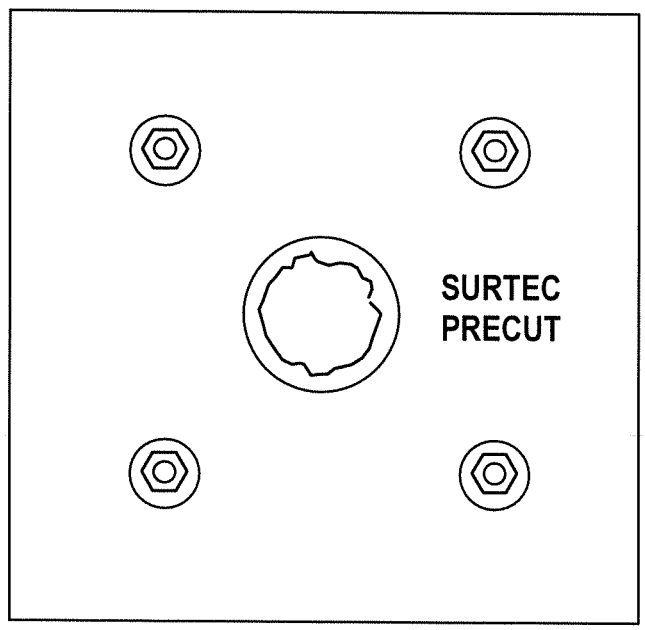
Figure 13:
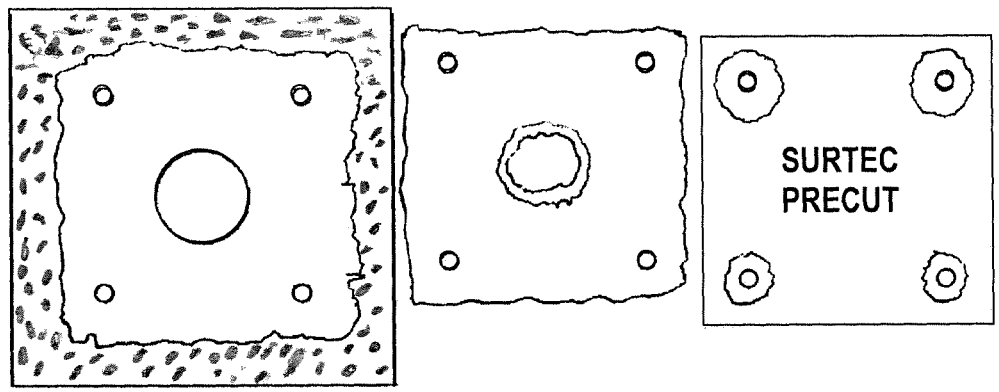
FIGS. 13 and 14 illustrate the SurTec skeleton pre-cut (and then conversion coated thus leaving strand ends coated) disassembled after 500 hours of salt fog, front side and opposite side.
Figure 14:
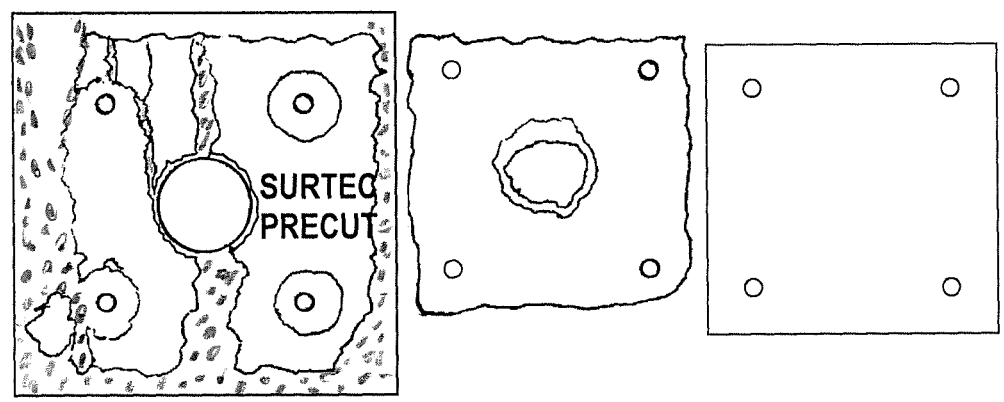
Figure 15:
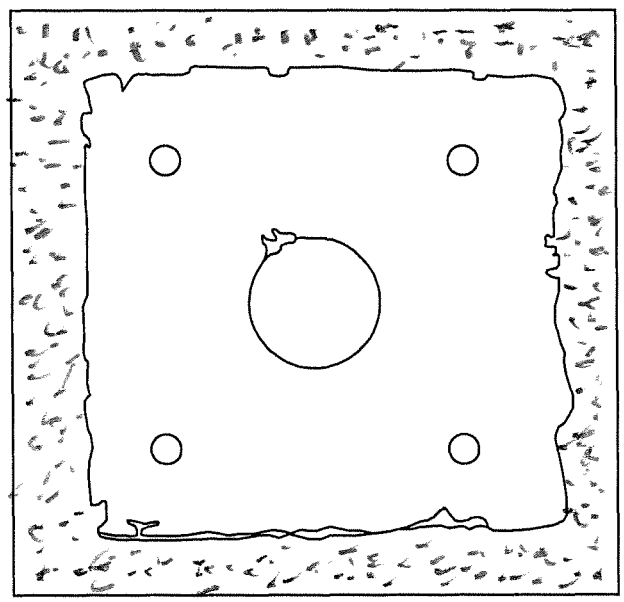
FIGS. 15 and 16, close-up of FIGS. 14 and 15 on aircraft side and antenna base side after 500 hours.
Figure 16:
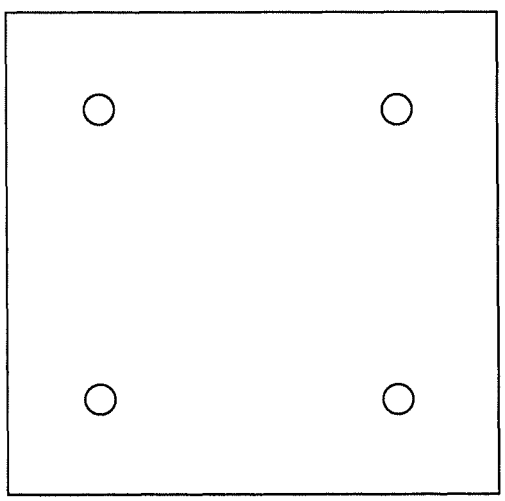
Figure 17:
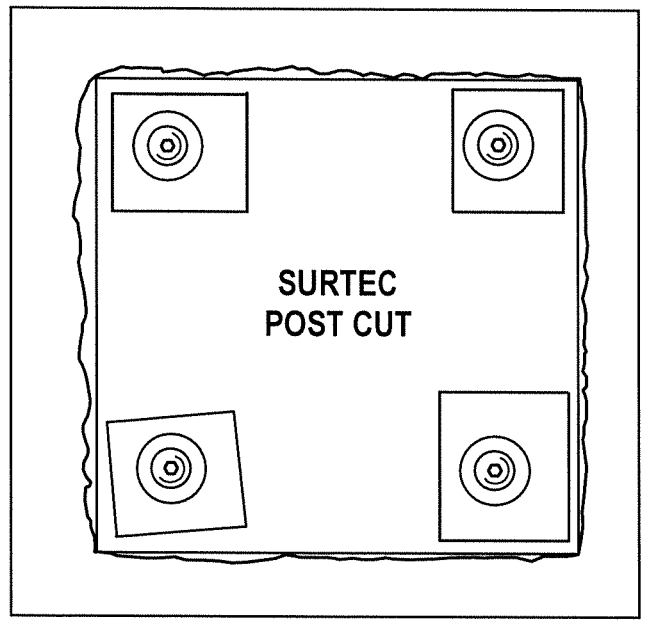
FIGS. 17-21 all illustrate results for SurTec post-cut (cutting skeleton after conversion coating thus leaving strand ends uncoated).
Figure 17:
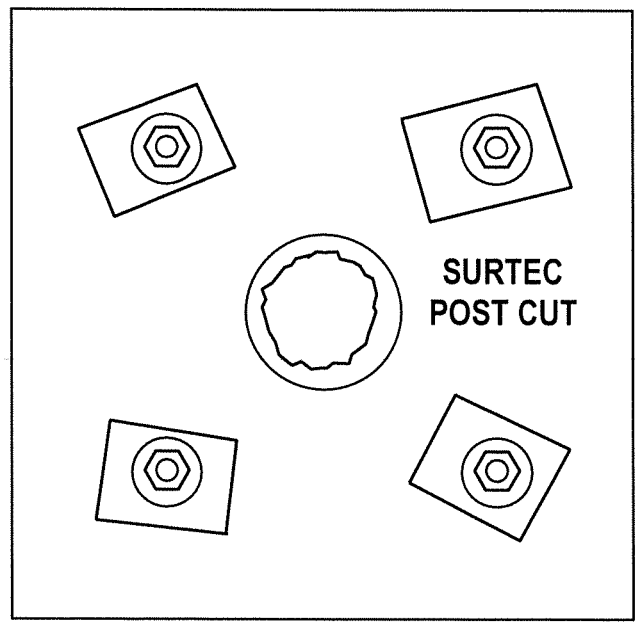
Figure 18:
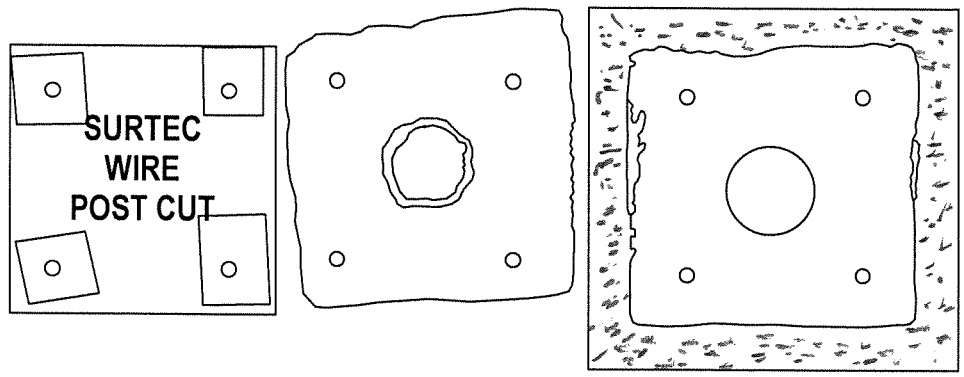
Figure 19:
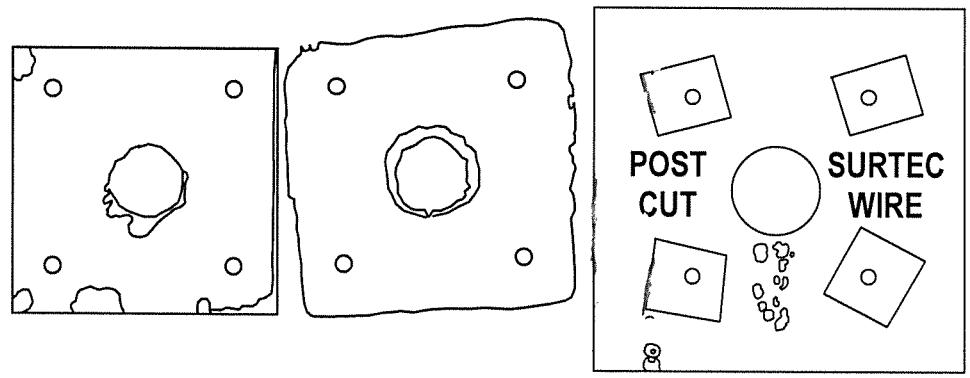
Figure 20:
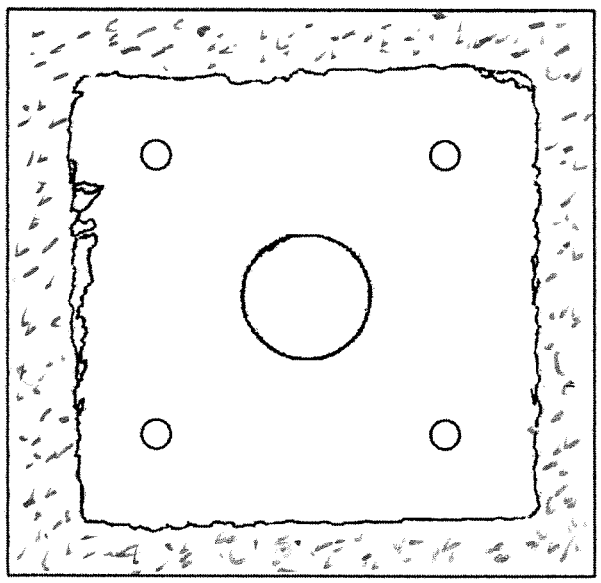
Figure 21:
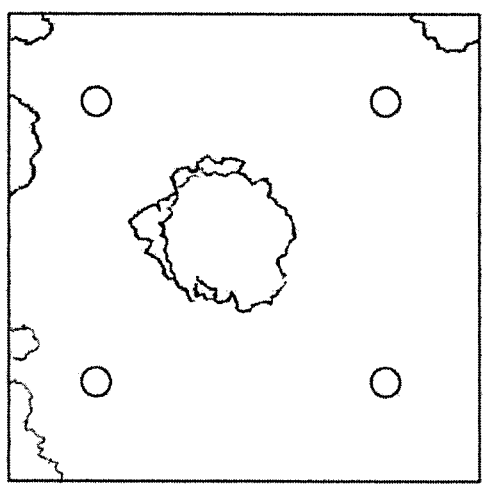
Figure 22:
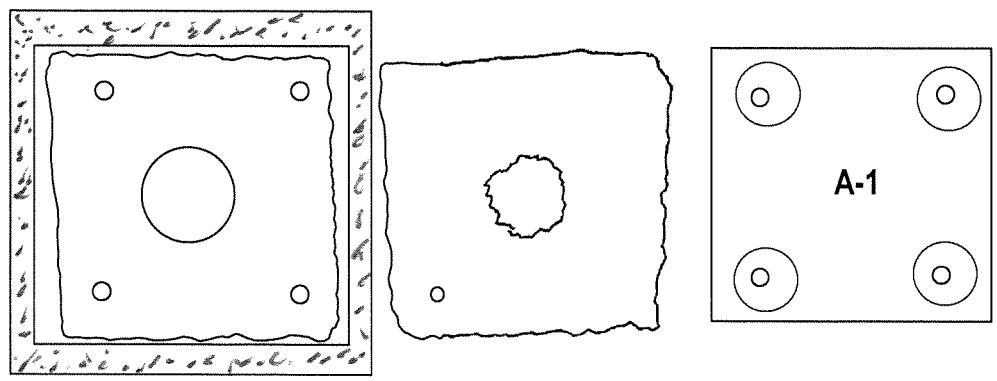
FIGS. 22-25 illustrate control, no conversion coating, same aluminum mesh, same article being tested, with FIGS. 22, 23, 24, and 25 showing the corrosion results for the control assembly.
Figure 23:
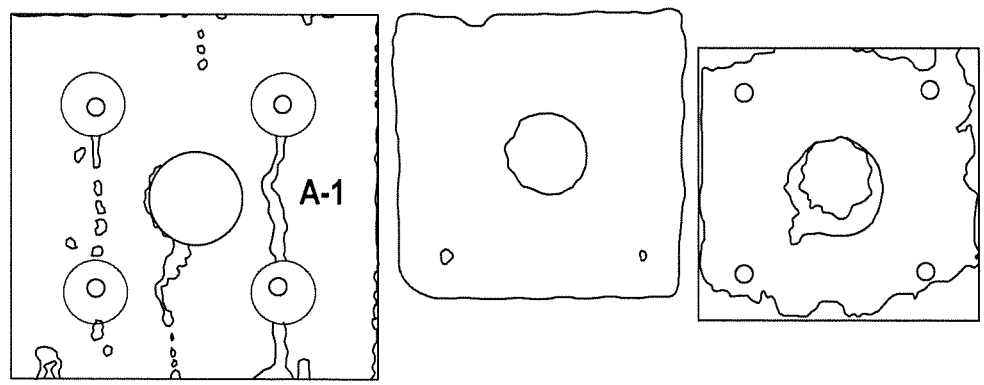
Figure 24:
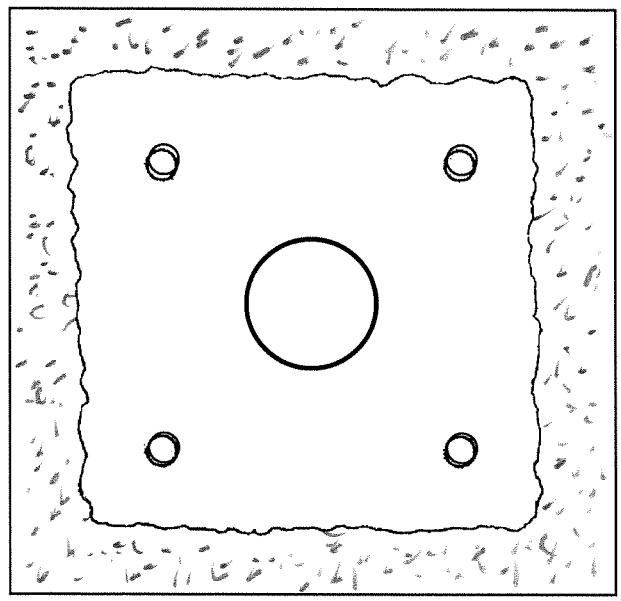
Figure 25:
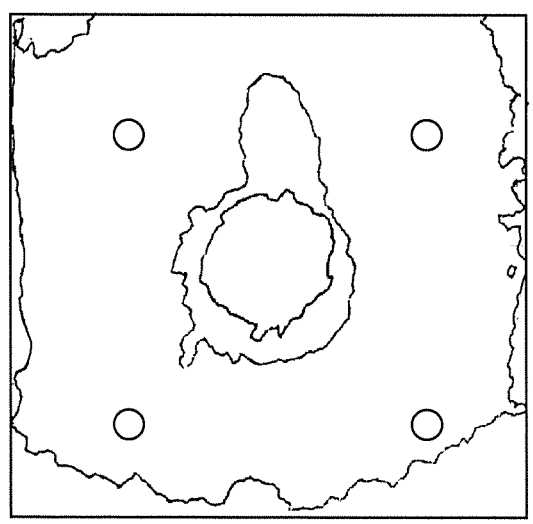
Figure 26:
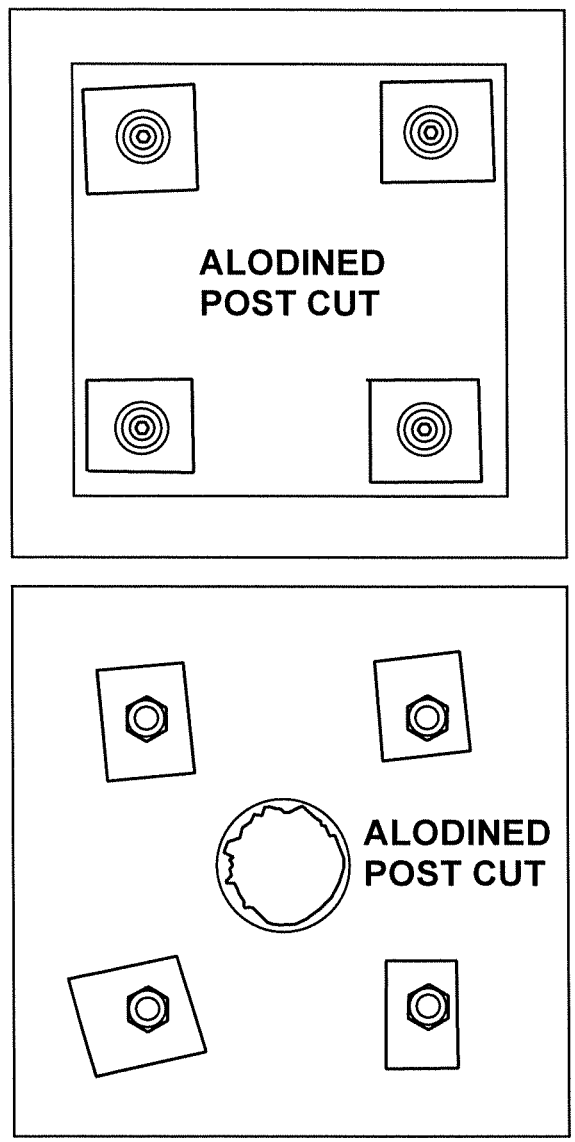
FIGS. 26-30 illustrate results for a post-cut Alodine treated wire mesh skeleton after 500 hours of salt fog exposure.
Figure 27:
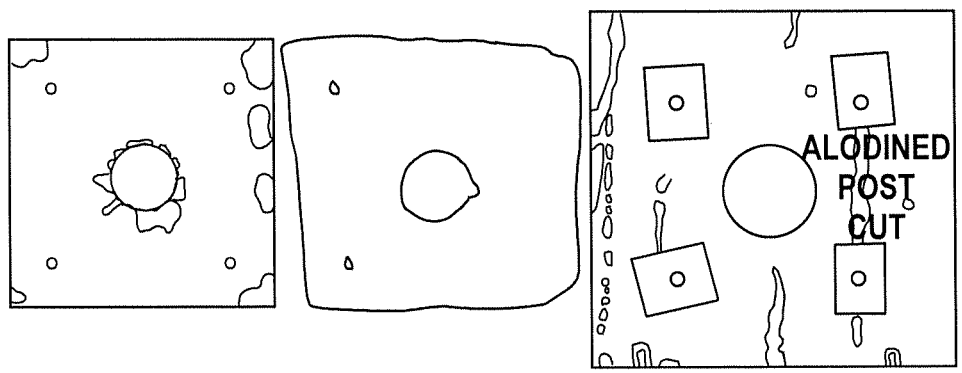
Figure 28:
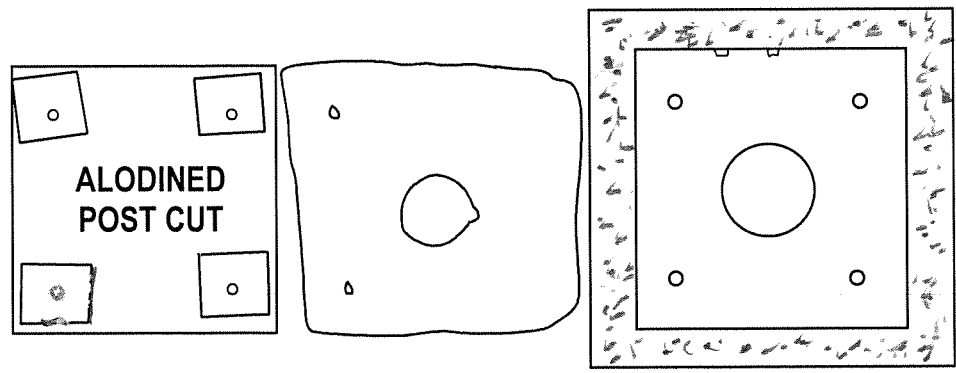
Figure 29:
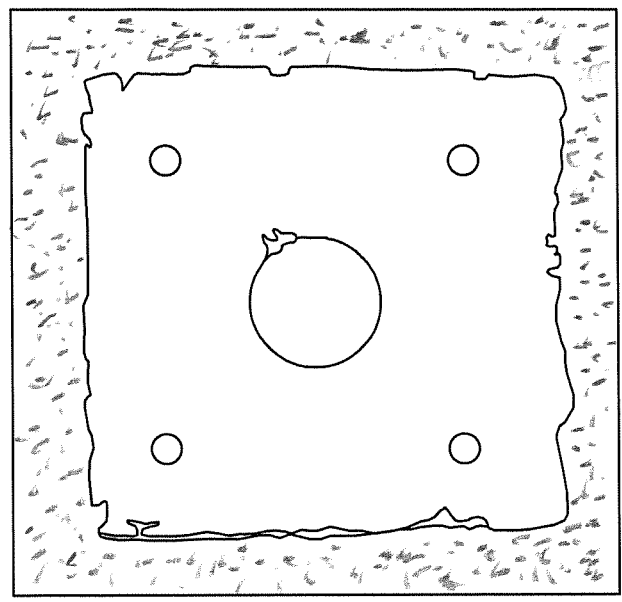
Figure 30:
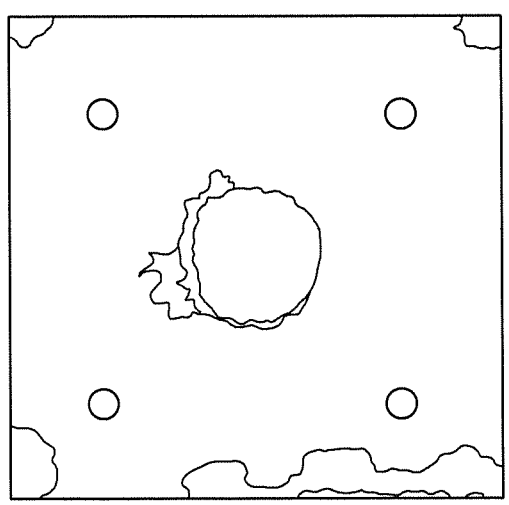
Figure 31:
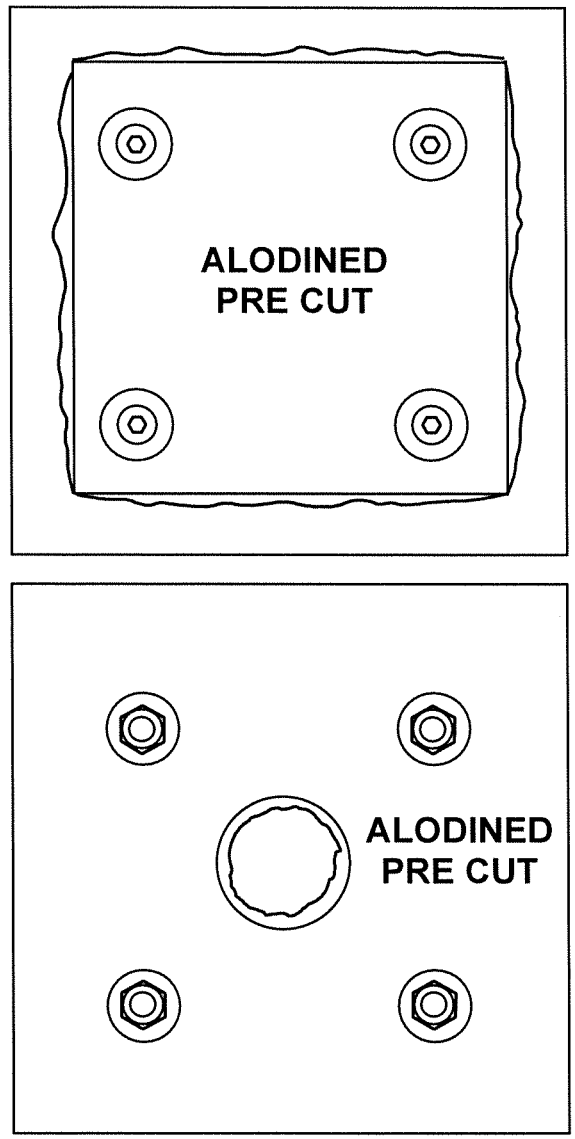
FIGS. 31-35 show Alodine treated pre-cut after 500 hours of salt fog.
Figure 32:
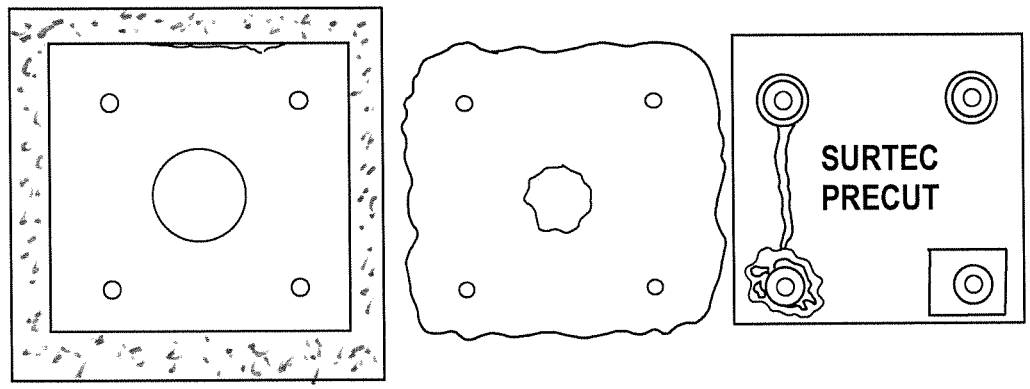
Figure 33:
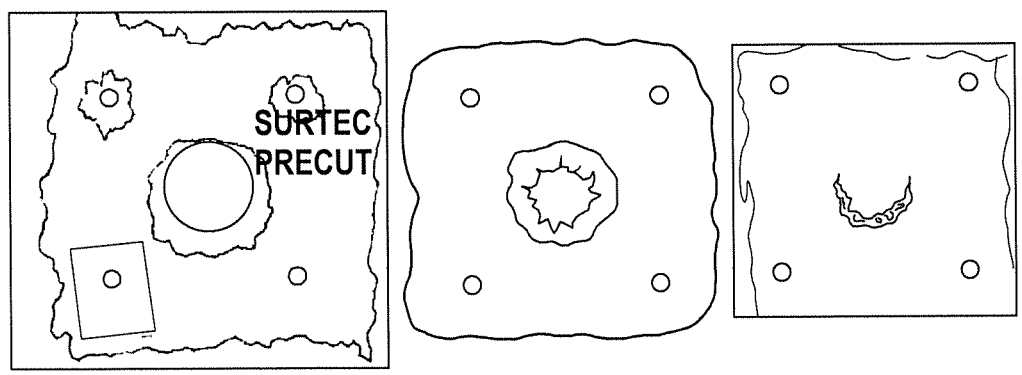
Figure 34:
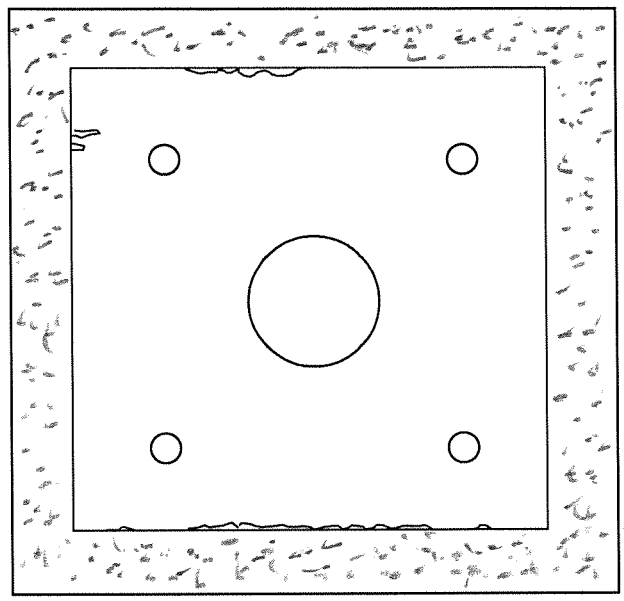
Figure 35:
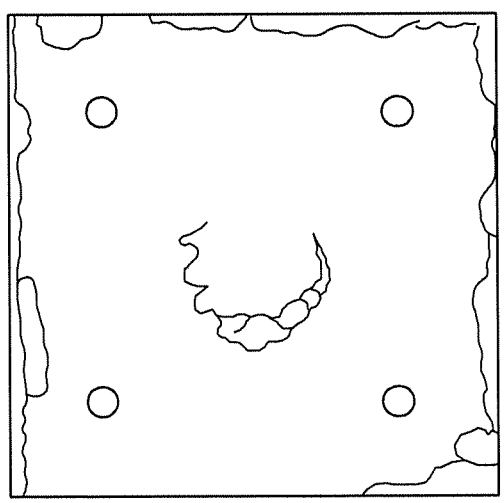

The test samples were made by applying the test specimen between two test coupons. The test coupons are one 2024 T3 Aluminum coupon, representing typical aircraft skin material, measuring 4"×4" and one 6061 T6 Aluminum coupon, representing typical antenna base material, measuring 3"×3". Each test coupon was scuffed with a Scot Brite pad and cleaned with a paper towel moistened with isopropyl alcohol before use. Four 8-32 stainless steel fasteners were electrically isolated using heat shrink sleeving around each fastener shank and Kapton tape under the steel washers on both sides. The fasteners were tightened to 17 in*lbs and retightened after 15 minutes (see FIG. 12 for a standard test assembly). After the fasteners had been tightened a second time, resistance was measured. Following removal from the salt fog chamber, resistance was measured again.

Each test assembly was photographed, the resistance was measured, and the samples were placed in the salt fog chamber. The specimen was supported or suspended between 15° and 30° off vertical so that one assembly would not drip on another. The assemblies did not contact each other or any metallic material. Test assemblies were exposed for a duration of 500 hours. At the end of each test duration, the test assembly was removed from the chamber, the salt deposits on surface were rinsed off, the resistance was measured, and the test assemblies were photographed before and after disassembly.

The testing apparatus consisted of a closed fog chamber in which a solution of 5% sodium chloride is atomized by a nozzle thus producing a dense saline fog. The apparatus also contains a salt solution reservoir, a supply or compressed air, specimen supports, and a means for control. The test samples are exposed to this severe corrosive environment. The chamber is a Singleton SCCH 21 chamber and is accepted by ASTM-B-117.

Example B (SUR-TEC 650, FIGS. 10-25)

SurTec 650® ChromitAL TCP Conversion Coating Treatment—SurTec 650 a reactive composition, provides a conversion coating for aluminum alloy such as 2, 5, 6, or 7,000 series aluminum alloy. SurTec 650® provides a coating that is free of hexavalent chromium. It may be disposed as normal waste. Coating may be by immersion. The time of immersion may be between about 1 to 5 minutes at a temperature preferably above 10° C. and below about 50° C. Pretreatment may range from about 30-40° C., temperature will influence bath time (warmer temperature lowers coating time). With a higher bath temperature for immersion, a shorter immersion time is sufficient. For good corrosion protection, for example, at 30° C., about four minutes (range about 2-6 minutes). Passivation (conversion) during dip (immersion) typically occurs at about pH 3.75 to 4 (may be adjusted with sulfuric acid or sodium hydroxide), concentration about 20% at about 30° C. for about five minutes. In one embodiment, the optimum coating weight for a conductive coating of SurTec is about 100 to 250 mg/dm2 square for EMI shielding (ASTM D-4935).

SurTec 650 meets MIL-DTL-81706B and MIL-DTL-5541F for bare metal corrosion (336 h NSS per ASTM B-117). It produces a heat resistant inorganic passivation layer. Further details may be found in the following US patents incorporated herein by reference: U.S. Pat. Nos. 6,375,726; 6,511,532; 6,521,029; 6,527,841. The standard procedure for immersion typically requires degreasing, deoxidizing using, for example, a chromium-free liquid desmutting product (e.g., SurTec 495) and, if silicium is less than 1%, alkaline etching using an appropriate alkaline etching solution (e.g., SurTec 181). Between each step, the surface has to be rinsed. Prior to passivation with SurTec 650, the aluminum surface must be cleaned and deoxidized thoroughly. The surface must be water-break free.

Materials Under Test:

Woven Mesh—Al 5056 18 strand/in each direction, 0.017 inch, gel thickness about 0.035"

Test B1 SurTec Treated Aluminum Mesh—Cut before SurTec treatment (FIGS. 13-16)

Test B2 SurTec Treated Aluminum Mesh—Cut after SurTec treatment\(FIGS. 18-21)

Regular Mesh—Conductive Antenna Gasket

In-Application Assembly—Same as Alodine

The process to coat the mesh with SurTec is as follows, this was performed at room temperature:

Using 3-5% alkaline cleaner, soak sample for 5 minutes, dunk sample in deionized water;

Using 2-7% alkaline etcher, soak sample for 1 minute, dunk sample in deionized water;

Using 17% desmutting for aluminum, soak sample for 3 minutes, dunk sample in deionized water;

Using 15% SurTec 650, soak sample for 4 minutes, dunk sample in deionized water;

Allow to dry (ambient temperature) for 24 hours.

See FIGS. 10-25 for typical results, Applicant conductive gasket cut after SurTec treatment before testing and after 500 hours of salt fog exposure. Electrical resistance of the samples was measured at 1.67 m·Ω before testing and 2.85 m·Ω after 500 hours of salt fog exposure. Resistance value change compare to Alodine may be a result of extra gel thickness. Resistance may be measured before and after the salt fog testing by placement of the probes of a milliohm-meter at the points marked A and B in FIG. 12.

Some of the environments which Applicant's novel gasket structures may use include antenna gasket (transmitting and/or receiving), for application to the surface of an aircraft, a fuel access door gasket (see U.S. Pat. No. 9,303,447 incorporated herein by reference) that may also be conductive and used with the conversion coated metallic gasket set forth herein.

In addition to the novel conversion coated metallic mesh gasket, Applicant's polyurethane gel, as set forth in the applications herein by reference, may include corrosion inhibitors that are compatible with polyurethane. These may include Hybricor 204, a pigment grade organic/inorganic zinc phosphate silicate corrosion inhibitor available from WPC Technologies, Milwaukee, Wis., or Heucophos SAPP, a strontium aluminum polyphosphate corrosion inhibitor, pigment grade, available from Heubach GmbH, Langelsheim, Germany, or Huecos ZAPP, a zinc aluminum polyphosphate corrosion inhibitor available from Heubach GmbH. These three are known to be compatible with polyurethane (see specification sheets) and are among the known non-chromate corrosion inhibitors used with aluminum.

See FIGS. 17-21 for typical results of the Av-DEC® conductive gasket cut after SurTec treatment before testing and after 500 hours of salt fog exposure. Electrical resistance of the samples was measured at 0.38 m·Ω before testing and 0.54 m·Ω after 500 hours of salt fog exposure.

See FIGS. 22-25 (control, no conversion coating) for typical results of the Av-DEC® conductive antenna gasket after 500 hours of salt fog exposure.

See FIGS. 26-30 for typical results Av-DEC® conductive gasket cut after alodine treatment before testing and after 500 hours of salt fog exposure. Electrical resistance of the samples was measured at 0.92 mΩ before testing and 1.32 m·Ω after 500 hours of salt fog exposure.

See FIGS. 31-35 for typical results of the Av-DEC® conductive gasket cut before alodine treatment before testing and after 500 hours of salt fog exposure. Electrical resistance of the samples was measured at 12.53 mΩ before testing and 14.92 m·Ω after 500 hours of salt fog exposure. Resistance value change could be attributed to extra gel thickness.

In one embodiment of Applicant's invention, an aluminum mesh is coated with one of the conversion coatings set forth herein and the gel is mixed with one of the corrosion inhibitors set forth herein. In one embodiment, the mixing of the gel and the referenced corrosion inhibitors may be according to Publication No. US-2016/0017143 (published Jan. 21, 2016), which describes the use of known "off-the-shelf" non-chromated corrosion inhibitors in tacky polyurethane gels. In another embodiment of Applicant's present invention, the non-chromated corrosion inhibitors are used in the polyurethane gel along with an uncoated or conversion coated metallic mesh, such as aluminum mesh gasket, wherein the mesh is not treated with a conversion coating. One such mesh is 5056AI 18 mesh available from Cleveland Wire or AvDec®.

| 500 Hour Salt Fog Corrosion and Resistance Summary | | |
|---|---|---|
| | Corrosion (qualitative) | Resistance Delta (measured) |
| Control (untreated) SurTec | FIGS. 22-25 | |
| Pre-cut | FIGS. 13-16 | 1.18 m · Ω[1] |
| Post-cut | FIGS. 18-21 | .16 m · Ω |

| 500 Hour Salt Fog Corrosion and Resistance Summary | | |
|---|---|---|
| | Corrosion (qualitative) | Resistance Delta (measured) |
| Alodine | | |
| Pre-cut | FIGS. 32-35 | 2.39 m · Ω[1] |
| Post-cut | FIGS. 27-30 | .40 m · Ω |

[1]Resistance value change could be attributed to extra gel thickness

A copper alloy mesh was also tested with the SurTec conversion coating, applied as set forth with the aluminum alloy mesh. The results were good for both resistance and corrosion prevention, though not quite as good in corrosion prevention as the coated aluminum mesh. The resistance prior to salt fog was 0.48 milliohms and after testing was 1.33 milliohms, with a resistance Delta of 0.85 milliohms. A nickel mesh was tested with similar results.

These tests show that conversion coatings help prevent corrosion of the aircraft parts and still provide a low resistance. Moreover, from a careful examination of the mesh itself, it appears that the mesh of the control has begun to be corroded slightly after 500 hours of salt fog, which was not observed on the coated meshes.

Although the invention has been described in connection with the preferred embodiment, it is not intended to limit the invention's particular form set forth, but on the contrary, it is intended to cover such alterations, modifications, and equivalences that may be included in the spirit and scope of the invention as defined by the appended claims.

The invention claimed is:

1. A gasket for use between aircraft parts under compression, the gasket comprising:
   a moisture proof body comprising an elastomeric polymer with a tacky, outer surface configured to releasably contact at least one of the aircraft parts;
   a metal skeleton encapsulated by the moisture proof body of the gasket;
   wherein the metal skeleton includes an electrically conductive or semi-conductive conversion coating as an outer surface thereof; and
   wherein, under compression, the moisture proof body deforms sufficiently to allow an aircraft part to contact the outer surface of the metal skeleton and provides electrical conductivity therethrough.

2. The gasket of claim 1, wherein the moisture proof body is a tacky polyurethane gel and wherein the metal skeleton is an aluminum or aluminum alloy mesh and wherein a resistance of the coated aluminum or aluminum alloy mesh is less than about 2.5 milliohms.

3. The gasket of claim 1, wherein the conversion coating is coated between about 100-250 mg/dm2.

4. The gasket of claim 1, wherein the elastomeric polymer is a polyurethane gel.

5. The gasket of claim 1, wherein the body includes conductive particles or fibers.

6. The gasket of claim 1, including a second skeleton.

7. The gasket of claim 6, wherein the second skeleton is a metallic mesh.

8. The gasket of claim 1, wherein the body is comprised of a polyurea polymer.

9. The gasket of claim 1, wherein the body is comprised of a tacky, deformable, flowable gel.

10. The gasket of claim 1, wherein the metal skeleton has a perimeter and wherein, when under compression, the body extends beyond the perimeter of the skeleton.

11. The gasket of claim 10, wherein the perimeter includes a cure in place injectable polymer.

12. The gasket of claim 1, wherein a resistance of the skeleton is less than about 2.5 m·Ω.

13. The gasket of claim 1, wherein the conversion layer comprises a chromium.

14. The gasket of claim 13, wherein the chromium is part of a chromate.

15. The gasket of claim 14, wherein the chromate includes trivalent chromium.

16. The gasket of claim 1, wherein the conversion coating includes a hexafluorozirconate.

17. The gasket of claim 1, wherein the body is a gel and includes corrosion inhibitors.

18. A method of producing a corrosion resistance assembly of aircraft parts comprising:
   contacting an exterior of a skeleton with a composition comprising a reactive composition to obtain a conversion coating on a top surface coat on the skeleton surface and assembling the skeleton comprising said top surface coat into an aircraft gasket having an elastomeric body and placing the gasket under compression between two parts of an aircraft.

19. The method of claim 18, wherein the skeleton is die cut before contacting.

20. The method of claim 18, wherein before the placing step and after the contacting step, the skeleton is die cut into a preselected shape.

21. The method of claim 18, wherein the reactive composition contains trivalent chromium.

22. The method of claim 18, wherein the reactive composition contains hexavalent chromium.

23. The method of claim 18, wherein the reactive composition contains chromium, either a trivalent or hexavalent chromium, and elastomeric body is a tacky gel body including a polyurethane or polyurea two component sealant.

24. An assembly of aircraft parts comprising:
   a first aluminum or aluminum alloy part having a first surface;
   a second aluminum or aluminum alloy part having a second surface;
   a multiplicity of fasteners for engaging the two aluminum or aluminum alloy parts;
   a gasket comprising a body comprising an elastomeric polymer; and
   a metal skeleton encapsulated by the body of the gasket;
      wherein the metal skeleton includes a conversion coating.

25. The assembly of claim 24, wherein the two parts comprise an aircraft antenna and an aircraft skin.

26. The assembly of claim 24, wherein the two parts comprise an aircraft fuel door surround and an aircraft fuel door.

27. A gasket for use between aircraft parts under compression, the gasket comprising:
   a moisture proof body having an outer surface comprising an elastomeric polymer; and
   a metal skeleton encapsulated by the moisture proof body of the gasket;
      wherein the metal skeleton includes an electrically conductive or semi-conductive conversion coating comprising an outer surface thereof;
      wherein the moisture proof body and the outer surface is comprised of a tacky, deformable, flowable gel which releasably contacts at least one of the aircraft parts;
      wherein the resistance of the skeleton is less than about 2.5 m·Ω; and
      wherein the skeleton contacts the aircraft parts when the body is under compression between the aircraft parts and provides electrical conductivity therethrough.

28. The gasket of claim 27, wherein the conversion layer comprises a chromium.

29. The gasket of claim 28, wherein the chromium is part of a chromate.

30. The gasket of claim 29, wherein the chromate includes trivalent chromium.

31. The gasket of claim 27, wherein the conversion coating includes a hexafluorozirconate.

32. The gasket in claim 1, wherein the gasket leaves no significant visible corrosion after salt fog immersion test according to ASTM B117 after 500 hours.

33. The gasket in claim 1, wherein the resistance of the skeleton is less than 2.5 m·Ω after salt fog immersion tests according to ASTM B117 after 500 hours.

34. The gasket in claim 1, wherein the body includes corrosion inhibitors.

35. The gasket in claim 27, wherein the gasket leaves no significant visible corrosion after salt fog immersion test according to ASTM B117 after 500 hours.

36. The gasket in claim 1, wherein the resistance of the skeleton is less than 2.5 m·Ω after salt fog immersion tests according to ASTM B117 after 500 hours.

37. The gasket in claim 1, wherein the body includes corrosion inhibitors.

38. The gasket in claim 1, wherein the skeleton is an aluminum alloy.

39. The gasket in claim 38, wherein the aluminum alloy is a 6000 series alloy.

40. The gasket in claim 38, wherein the aluminum alloy is a 2000 series alloy.

41. The gasket in claim 38, wherein the aluminum alloy is a 3000 series alloy.

42. The gasket in claim 38, wherein the aluminum alloy is a 4000 series alloy.

43. The gasket in claim 38, wherein the aluminum alloy is a 5000 series alloy.

44. The gasket in claim 1, wherein the conversion coating is on an outer surface of an end of a wire of a skeleton having wire ends.

45. A gasket for use between aircraft parts under compression, the gasket comprising:
   a moisture proof body comprising an elastomeric polymer with a tacky, outer surface configured to releasably contact at least one of the aircraft parts;
   a metal skeleton substantially encapsulated by the moisture proof body of the gasket in an uncompressed state;
      wherein the metal skeleton includes an electrically conductive or semi-conductive conversion coating on an outer surface thereof; and
      wherein, under compression, the moisture proof body deforms sufficiently to allow the aircraft parts to contact the outer surface of the metal skeleton and provide electrical conductivity therethrough.

46. The gasket of claim 45, wherein, under a nominal electrode pressure of about 200 psi, the conversion coated skeleton has less than 200 milliohms of resistance after 500 hours of exposure at 5% salt fog.

47. The gasket of claim 46, wherein the conversion coating weight is 100-250 mg/dm2.

48. The gasket of claim 46, wherein the conversion coating is a non-chromate conversion coating.

49. The gasket of claim 46, wherein the conversion coating is a trivalent chromium conversion coating.

50. The gasket of claim 46, wherein the skeleton is a cooper alloy skeleton.

51. The gasket of claim 46, wherein the skeleton is a nickel alloy skeleton.

52. The gasket of claim 46, wherein the skeleton is an aluminum alloy skeleton.

53. The gasket of claim 46, wherein the body comprises a gel and the gel includes no corrosion inhibitors.

54. The gasket of claim 46, wherein the body comprises a gel and the gel includes corrosion inhibitors.

55. The gasket of claim 54, wherein the corrosion inhibitors are from a group of non-chromated corrosion inhibitors.

56. The gasket of claim 46, wherein the gasket causes no visible corrosion to the aircraft parts after 500 hours of exposure at 5% salt fog.

57. The gasket of claim 46, wherein the resistance of the conversion coated skeleton is less than 2.5 milliohms after 500 hours of exposure at 5% salt fog.

58. The gasket of claim 46, wherein the body contains fillers.

59. The gasket of claim 58, wherein the body fillers include conductive fibers.

60. A gasket for use between aircraft parts under compression, the gasket comprising:
    a moisture proof body comprising an elastomeric polymer with a tacky, outer surface configured to releasably contact at least one of the aircraft parts;
    a metal skeleton substantially encapsulated by the moisture proof body of the gasket in an uncompressed state;
        wherein the metal skeleton includes an electrically conductive or semi-conductive conversion coating on an outer surface thereof;
        wherein, under compression, the moisture proof body deforms sufficiently to allow the aircraft parts to contact the outer surface of the metal skeleton and provide electrical conductivity therethrough;
        wherein, under a nominal electrode pressure of about 200 psi, the conversion coated skeleton has less than 200 milliohms of resistance after 500 hours of exposure at 5% salt fog; and
        wherein the gasket causes no visible corrosion to the aircraft parts after 500 hours of exposure at 5% salt fog.

61. The gasket of claim 60, wherein the resistance of the conversion coated skeleton is less than 2.5 milliohms after 500 hours of exposure at 5% salt fog.

\* \* \* \* \*